United States Patent [19]

Tucker, Jr.

[11] 3,893,068
[45] July 1, 1975

[54] TRAILER BACK-UP-RIGHT DEVICE

[76] Inventor: Raymond A. Tucker, Jr., 1048 Southwest 1 Ter., Pompano Beach, Fla. 33060

[22] Filed: Sept. 10, 1974

[21] Appl. No.: 504,693

[52] U.S. Cl. .................. 340/51; 33/264; 33/286; 116/63 P
[51] Int. Cl.² .......................................... G08G 1/14
[58] Field of Search ...... 116/63 P, 63 PR, 63, 63 R, 116/28, 124 R; 350/97, 100; 33/286, 264; 340/51, 275; 240/10.6, 22; 356/172

[56] References Cited
UNITED STATES PATENTS

| 1,981,188 | 11/1934 | Payitt | 340/51 |
| 2,237,536 | 4/1941 | Wells, Jr. | 116/63 P |
| 2,984,011 | 5/1961 | Hamilton | 33/264 |
| 3,834,789 | 9/1974 | Brudy | 116/63 P |

FOREIGN PATENTS OR APPLICATIONS

| 1,802,834 | 12/1968 | Germany | 116/63 P |

Primary Examiner—S. Clement Swisher
Assistant Examiner—Marcus S. Rasco
Attorney, Agent, or Firm—Marden S. Gordon

[57] ABSTRACT

A guide device for use in the backing up of a towed trailer into a parking space both at night and during the day and including a pair of light containing units each having a housing with a light source contained therein and batteries contained therein for powering the light source, with each having a port extending through the front thereof for directing light forwardly therefrom, and a port disposed in the sides thereof spaced 90° from the first port to direct light sideways from the unit. In use, an individual positions one unit on each side of the parking space into which the trailer is to be backed into such that the side ports are disposed and spaced apart in confronting relationship and the front ports face forwardly therefrom to be visible to the vehicle driver with the units thus acting as guides to the vehicle driver for backing the trailer into the parking space.

8 Claims, 8 Drawing Figures

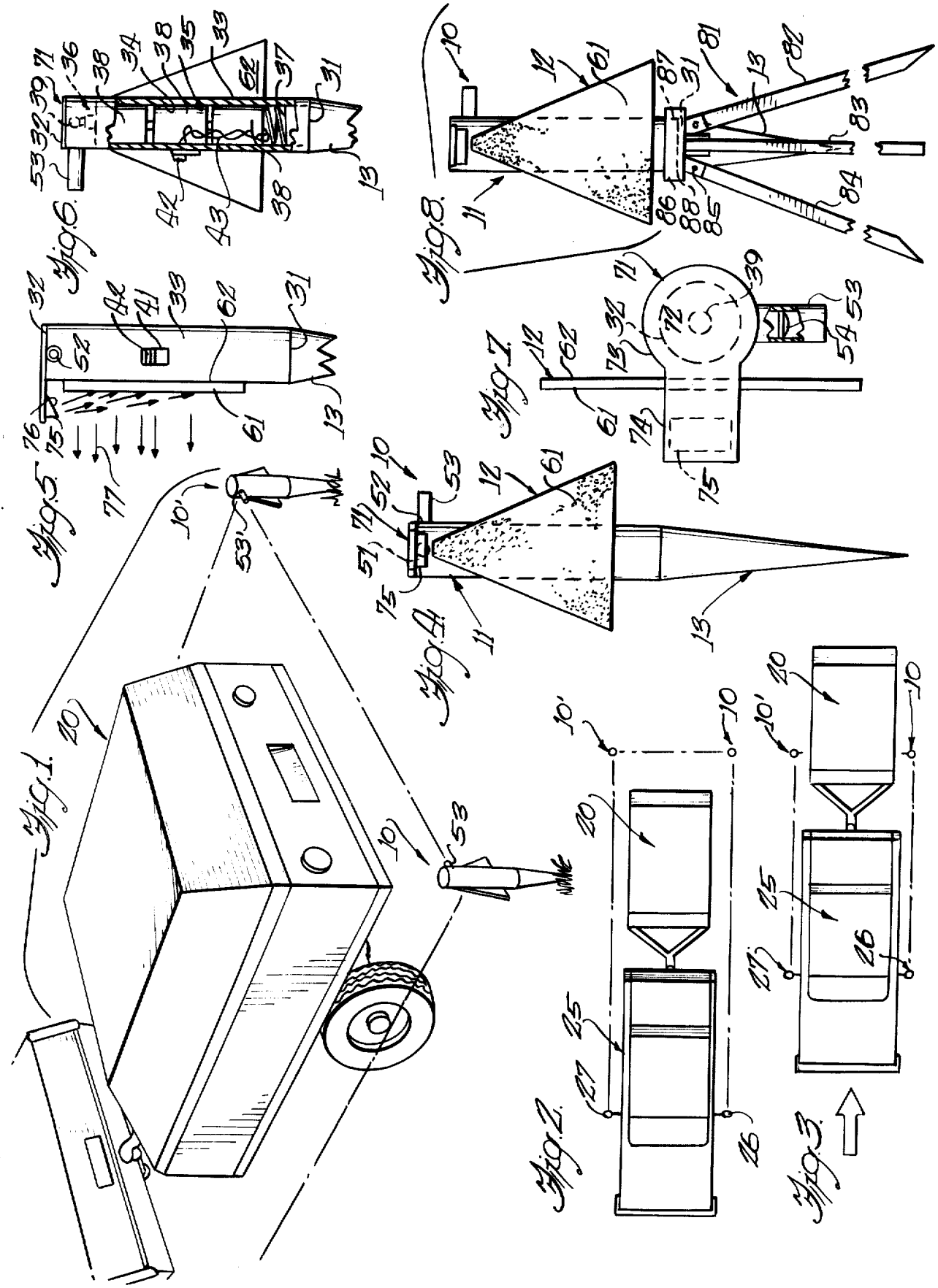

TRAILER BACK-UP-RIGHT DEVICE

BACKGROUND OF THE INVENTION

1. Field of the Invention

This invention relates generally to trailers and more particularly to a novel and improved guide device intended for use with towed trailers in a manner guiding a driver of the vehicle towing the trailer within the process of backing the trailer into a parking space both during the daytime and during the night.

2. Description of the Prior Art

One of this country's fastest growing leisure time activities is camping, and accordingly the demand for towed trailer type campers, towed house trailers, and the like increases every year. One problem familiar to all drivers of vehicles which tow trailers is the difficulty experienced while attempting to back a trailer into a parking space, this being difficult in the daytime and of exceptional difficulty at night especially if the driver is alone in the vehicle as he is unable to properly determine the configuration of the space into which the trailer is being backed into without constantly backing up a short distance, getting out of the vehicle to inspect the space, returning to the vehicle to again back up a short distance, and continuing this time consuming and frustrating process until the trailer is properly parked in the space.

The difficulty of backing a trailer into a parking space may also be dangerous, such as when the selected space is in the vicinity of a cliff, deep drainage ditch, and the like with it being difficult to determine the exact position to stop the backing of the trailer within the parking space.

The problem of backing a trailer into a parking space has long been known, with the usual solution thereto being for the driver of the vehicle to have the assistance of one or more other persons who stand in the parking space where they are visible to the driver through use of the driver's rear view mirrors and direct the driver into position in the parking space. This is frequently a frustrating and time consuming experience for both the driver and the individual providing the guidance, with a driver of a vehicle not having such assistance having to normally enlist the assistance of a passerby or other individual to provide the required guidance. In this day and age of individuals not withing to become involved with the problems of others, this is sometimes an embarassing and difficult situation for the vehicle driver while attempting to enlist such assistance.

While prior art devices are known for use in assisting the driver of a vehicle in the backing of a trailer, such devices suffer from one or more disadvantages as to requiring permanent attachments to the trailer, a series of complex mirrors subject to constant adjustment and maintenance due to road vibrations during the towing of the trailer, and the like. Further, these devices are of a complex and expensive structure requiring continued maintenance and upkeep by an individual.

SUMMARY OF THE INVENTION

The present invention remedies and overcomes all of the deficiencies and disadvantages of presently known or presently available trailer guide devices by providing a novel trailer back-up-right guides device for use on hard or soft ground, for use both during the nighttime and daytime to assist the driver of a vehicle in the backing up of a towed trailer into a parking space with maximum efficiency and thus eliminating the time and frustration now encountered by an individual driver in the backing up of a trailer into a parking space without the guide device of the present invention.

It is a feature of the present invention to provide a trailer back-up guide device which is relatively simple in its construction and which therefore may be readily manufactured at a relatively low cost and by simple manufacturing methods.

A further feature of the present invention provides a trailer back-up guide device which is possessed of few parts and which therefore is unlikely to get out of order.

Still a further feature of the present invention provides a trailer back-up guide device which is of a rugged and durable construction and which therefore may be guaranteed by the manufacturer to withstand many years of intended usage.

Yet still a further feature of the present invention provides a trailer back-up guide device which is easy to use and reliable but efficient in operation.

Still a further feature of the present invention provides a trailer back-up guide device which is aesthetically pleasing and refined in appearance.

Yet still a further feature of the present invention provides a trailer back-up guide device which is usable with any type, brand of manufacture, and structure and configuration of trailer for assisting a driver in backing the same into a parking space.

Other features and advantages of this invention will be apparent during the course of the following description.

BRIEF DESCRIPTION OF THE DRAWINGS

In the accompanying drawings forming a part of this Specification, and in which like reference characters are employed to designate like parts throughout the same:

FIG. 1 is a perspective view of the back end of a towed trailer in the process of being backed into a parking space and showing the guide device of the present invention in position for use therewith;

FIG. 2 is a diagrammatic top plan view of a towed trailer affixed to a towing vehicle being backed into a parking space with the guide devices positioned for use therewith;

FIG. 3 is a top plan view similar to FIG. 2 but with the vehicle and towed trailer positioned in the parking space;

FIG. 4 is a front elevational view of one of the units of the invention;

FIG. 5 is a side elevational view of one of the units of the invention;

FIG. 6 is a back elevational view of the unit of FIG. 4 partially broken away to illustrate interior details thereof;

FIG. 7 is a top plan view of unit of FIG. 4; and

FIG. 8 is a front elevational view of the unit of FIG. 4 mounted on the accessory tripod.

DESCRIPTION OF THE PREFERRED EMBODIMENT

Referring now to the drawings in detail there is illustrated a preferred form of a trailer back-up-right guide device constructed in accordance with the principles of the present invention and which is designated generally in its entirety by the reference 10 which is comprised of a hollow tubular housing 11, a triangularly shaped reflector member 12, and a supporting stake 13 adapted to be driven into the ground or other soft surface for supporting the guide device in position thereon. It is to be understood that the guide device 10 is provided in pairs such as illustrated in FIG. 1 by reference 10 and 10', this being as illustrated for use in the guiding of the backing up of a wheel supported towed trailer 20 which is being towed and guided by towing vehicle or car 25 provided with projecting side view mirrors 26 and 27 through which are seen the devices 10 and 10' respectively.

The tubular housing 11 is of an elongated hollow cylindrical member having a closed bottom end 31, an open top end 32, and cylindrical side walls 33 defining interiorly thereof a compartment 34 which is divided into a battery containing chamber 35 and a light containing chamber 36 at the top end thereof adjacent open end 32.

Disposed in the bottom end of compartment 34 is a spiral spring 37 which rests on the bottom end and projects inwardly of the compartment and onto which there is adapted to be placed in tandem electrical series relationship 3D-size dry cell batteries 38. A suitably sized electric lamp 39 is mounted in light chamber 36 and is connected in electrical series relationship to the batteries 38 for selective energization thereby.

The interior surfaces of light chamber 36 are coated with an interior reflector for maximizing the light output from lamp 39.

A longitudinally extending slot 41 is provided in side wall 33 and receives therein an electrical switch having an actuating member 42 projecting through the slot for operation exteriorly of the housing member. The switch 42 is connected by suitable electrical wires 43 in electrical series relationship with the batteries 38 and electric lamp 39 to selectively control the energization and de-energization of the lamp.

An aperture or port 51 is provided in the front of housing member side walls 33 and opens into the light chamber 36 in a position disposed at the apex of triangular reflector 12. Circumferally aligned with aperture 51 and disposed at a circumferally spaced apart 90° therefrom is a side aperture or side port 52 having a tubular barrel 53 extending concentric therewith and axially outwardly therefrom and supporting therein a lens 54 which is in communication through the side port 52 with the light chamber 36. In this manner light from the electric lamp 39 exits from the light chamber 36 both through the side port 52 and the front port 51 for visibility exteriorly of the unit 10.

Affixed to the front of side wall 33 immediately beneath front port 51 is the triangular reflector member 12 which extends in a plane normal to the axis of the front port with its apex being adjacent the front port, the reflector member having a front reflective surface 61 which is mirrored, coated with reflective material, or the like, and a back surface 62.

Affixed to the bottom end 31 of the housing 11 is an inverted conical stake 13 adapted to be plunged into the ground for retaining the unit in position thereon.

For closing the open top end 32 of housing 11 there is provided a cap 71 threadedly received thereon and having a flat top surface 72 which includes a circular member 73 and a radially outwardly projecting member 74 formed contiguous therewith and having supported at the bottom end thereof a prism-like mirror 75 which is positioned directly in front of front port 51 when the cap is threaded in position on the housing 11. The mirror 75 has a reflective front surface 76 facing port 51 which is disposed at an angle to receive light rays from the port and reflect a portion of those light rays downwardly onto the face surface 61 of reflector 12 from whence they are reflected forwardly therefrom, the remaining portion of light passing through port 51 bypassing mirror 75 and passing forwardly therefrom. The path of the light ray from port 51 is generally as seen by the arrows 77 of FIG. 5.

The lens 54 of barrel 53 concentrates the light received through side port 52 from electric lamp 39 to direct a concentrated light beam outwardly therefrom.

For use on hard ground, such as concrete, asphalt and the like, where the stake 13 could not be used to penetrate the same, there is provided a tripod 81 having three legs 82, 83 and 84 hingedly connected at their top ends by hinge pins 85 to a collar member 86 provided with a recess 87 extending therethrough and having an annular seat 88 to receive therein the bottom end portion 31 of the housing 11 to support the unit 10 on the tripod with the legs 82–85 spread apart to maintain the unit 10 in a vertical position.

It is to be noted that the units 10 and 10' are identical in construction except that unit 10 as seen in FIG. 1 has a side port opening out to the right side of the front port 51 whereas unit 10' has the side port opening out on the left side relative to the front port such that when used as pairs the units 10 and 10 may be positioned in the ground such that the barrels 53 and 53' are disposed in aligned confronting relationship with the front ports 51 on each of the units facing in the same parallel directions.

In operation, the batteries 38 are inserted into each of the units with cap 71 being placed in position thereon. The vehicle driver then places the unit on opposite sides of the parking space into which the trailer 20 is to be backed into, such as illustrated in FIGS. 1–3, with the front ports 51 of the units facing forwardly and with the side ports in approximate alignment and facing inwardly so as to direct light from electric lamp 39 against the sides of the trailer 20 when backed therebetween. The vehicle driver then returns to the vehicle and through side view mirrors 26 and 27 uses the light emanating from the front ports 51 as reflected by front surface 61 of reflector 12 to guide him into the parking space accurately in a side-to-side relation. This thus provides side boundaries and markings for the guidance of the vehicle driver in the backing up of the towed trailer into the parking space. As the towed trailer then backs deeper into the parking space, the light emanating from the side ports 52 strike the side walls of the trailer, and since the driver can see the reflection of the lights on the sidewalls through the side rear view mirrors 26 and 27 he knows that he has backed to the depth in which he initially placed the units 10 and 10' and can allocate accordingly should he desire to go deeper into the parking space by using the lights as guides along the side edges of the trailer to accurately stop the trailer in the exact position desired by the driver without requiring assistance or guidance from other individuals.

It is to be understood that the form of this invention herewith described and shown is to be taken as a preferred example of the same, and that this invention is not to be limited to the exact arrangement of parts shown in the accompanying drawings or described in this Specification as various changes in the details of construction as to shape, size, and arrangement of parts may be resorted to without departing from the spirit of the invention, the scope of the novel concept thereof, or the scope of the sub-joined claims.

Having thus described the invention, what is claimed is:

1. A trailer back-up-right guide device intended for use by a vehicle driver in the backing up of a towed trailer into a parking space without requiring the assistance or guidance of other individuals, the device comprising a pair of guide devices, each guide device comprising, in combination:
    an elongated hollow tubular housing having a closed bottom end, an open top end, and cylindrical side wall surfaces;
    a compartment defined interiorly of the side walls with access thereto being through the open top end of the housing;
    an inverted conically configured stake affixed at its base to the closed bottom end and projecting downwardly therefrom to its apex and adapted to be stabbed into the ground for supporting the housing at a position above the ground;
    a reflector affixed to the front of the cylindrical sidewall surface along a tangential line of contact therewith projecting outwardly symetrically relative to the line of contact;
    an electric lamp disposed inwardly of said compartment;
    a plurality of electric dry cells disposed inwardly of said compartment;
    an electrical switch mounted on said housing;
    means connecting an electric lamp, said dry cell batteries, and said electrical switch in electrical series relationship such that the switch selectively controls the energization and de-energization of the electric lamp;
    a cap closing the open top end of the housing compartment to retain the electric lamp and dry cells therein;
    an aperture extending through the housing side walls in communication with the electric lamp for directing light rays therefrom in a direction forwardly of the housing normal to the plane of said reflector;
    a second aperture in the side walls of the housing in communication with said electric lamp for directing light rays therefrom in a direction approximately 90° from said first aperture;
    means deflecting a portion of the light rays from said front aperture onto a face surface of said reflector;
    whereby upon energization of said electric lamp light rays are emmitted through said first and second ports.

2. The device as set forth in claim 1 wherein said housing compartment is divided into a battery containing chamber and an electric lamp containing chamber, said battery chamber being disposed adjacent the bottom end of said housing with said electric lamp chamber being disposed adjacent said open top end of said housing; and further comprising a spring associated with said dry cell batteries in said battery chamber for resiliently retaining a plurality of said batteries in electrical tandem relationship with adjacentmost surfaces of the batteris being maintained in tight electrical contact with each other.

3. The device as set forth in claim 2 wherein said electric lamp chamber further comprises an interior reflector disposed completely about the lamp chamber to intensify the beams of light rays emitted from said first and second apertures.

4. The device as set forth in claim 3 wherein said reflector is of a flat triangular configuration having a reflective front surface pointing away from said housing and a back surface having a line of contact affixed tangentially to said cylindrical side walls of said housing.

5. The device as set forth in claim 4 wherein said means for reflecting a portion of said light emitted from said first port onto said face surface of said reflector comprises a mirror affixed to said cap and extending downward and outward therefrom at an angle to be horizontally interposed in front of a major portion of said front aperture with the angle of said mirror being such that light rays emitted from said front port impinge upon said mirror and are reflected downwardly therefrom across the major portion of said face surface of said reflector from whence they are reflected in a forward direction to enhance the visibility of said reflector at night.

6. The device as set forth in claim 5 wherein said cap includes a first portion threadedly received in said top open end of said housing to close the same, a flat head portion including a circular disc shaped member with a radially outwardly extending flat flange like member projecting parallel to the axis of said front aperture and vertically above the same when said cap is fastened to said housing, said mirror being fastened to the lower surface of said flange member to project into the path of said front aperture for reflecting said light rays therefrom onto said face surface of said reflector.

7. The device as set forth in claim 6 further characterized by said side aperture including an elongated tubular hollow barrel having one end affixed to said housing concentric with said side aperture with said barrel projecting axially outwardly, therefrom radially of said housing, and a lens disposed in said barrel normal to the axis thereof and adapted to concentrate the light rays emitted from the electric lamp through said side aperture into a concentrated light beam to be directed out of the open free end of said barrel.

8. The device as set forth in claim 7 further characterized by a supporting tripod comprising, in combination:
    a cylindrical collar member having a top surface and a bottom surface;
    an opening extending axially through said collar member and being of a diameter to removably receive said bottom end of said housing therethrough with said stake extending out of the bottom end of said collar;
    an inverted truncated conically shaped annular seat formed in said collar opening adjacent said bottom end thereof and adapated to engage the base end of said stake and prevent the same from passing therethrough so as to support said housing in a manner projecting upwardly and outwardly therefrom;
    three independent leg members each of an identical length;
    pivot means hingedly affixing the top end of each of the leg members to the bottom end of the collar with said leg members being spaced equally about said collar;
    said leg members being substantially longer than the length of said stake such that hingedly opening said leg members to a supporting position for said collar will retain said stake spaced a distance from said ground with said housing supported on said collar in a vertical manner.

* * * * *